United States Patent Office 2,846,486
Patented Aug. 5, 1958

2,846,486
ISOMERIZATION OF CARANE

Alfred L. Rummelsburg, Chadds Ford, Pa., assignor to Hercules Powder Company, Wilmington, Del., a corporation of Delaware No Drawing. Application January 27, 1956
Serial No. 561,923

3 Claims. (Cl. 260—666)

The present invention relates to a process for the isomerization of carane to a product rich in menthenes.

The hydrocarbon carane is easily prepared by hydrogenation of carene. The latter compound has never been in abundant supply but in recent years investigation of certain western pine stumps as a source for rosin and terpenes has disclosed that carene is a major constituent of the extracts of such stumps. This finding has thus made available a potentially rich source of carene and, indirectly, of carane.

It is known that menthylphenol, which is a valuable ingredient of certain synthetic resin compositions, can be produced readily by condensing a menthene with phenol. However, in the past the relatively high cost of menthenes has been a deterrent to the production and sale of menthylphenol in quantity. It is accordingly an object of the present invention to provide a method whereby carane can be isomerized to a product rich in menthenes thus furnishing an important step in an inexpensive route for the production of menthylphenol.

In accordance with the invention there is provided a process which comprises contacting carane at a temperature of from about −10 to 200° C. with a strong acid that is nonoxidizing at the stated temperature in the presence of water in an amount sufficient to dilute said acid to the point that isomerization of carane to menthenes takes place without substantial polymerization.

It was not to be expected that carane could be isomerized under the aforesaid conditions in view of indications in the literature that such closely related hydrocarbons as pinane and thujane are unaffected by dilute solutions of strong acids even at relatively high temperatures. It is known, of course, that carane, as well as pinane and thujane, can be polymerized by treatment with concentrated solutions of strong acids. This invention is distinguished from these known polymerization reactions by the use of more dilute solutions of acid which makes possible an entirely different result.

In order to illustrate the invention in a more specific manner, the following examples are presented. Parts and percentages are by weight unless otherwise specified.

Example I

Into a reaction vessel there were placed 200 parts of substantially pure carane (bromine number 0.5–1.3) and 200 parts of aqueous 50% sulfuric acid. This mixture was heated with continuous agitation over a period of 20 minutes to the reflux temperature (approximately 105° C.) and this temperature was maintained over a period of 7 hours. At various times during the course of the reaction, samples of the reaction mixture were withdrawn, and the oil layer separating from each sample was washed with water and dried. Bromine numbers of the samples were taken to indicate the course of the reaction. The samples were also examined by infrared analysis. The results are tabulated below:

| Time (Hrs.) | Bromine Number | I. R. Analysis (Approximate) |
|---|---|---|
| 1 | 20 | 80–90% carane, 5% or less 3-menthene, 1–2% 8, 9-menthenes. |
| 2½ | 38 | No Apparent Difference. |
| 5 | 65 | 65–70% carane, 10% 3-menthene, 3–4% 8,9-menthenes. |
| 7 | 84 | 50–60% carane, 20% 3-menthene, 5–6% 8,9-menthenes. |

It is apparent that the reaction proceeded with fair rapidity resulting in a product containing an appreciable quantiyt of menthenes which can, if desired, be isolated by conventional techniques.

Example II

The procedure of Example I was repeated using 100 parts of aqueous 50% sulfuric acid instead of 200 parts. The bromine numbers of samples taken at various times are tabulated below:

| Time (hrs.): | Bromine number |
|---|---|
| 1.0 | 19 |
| 2.5 | 34 |
| 5.0 | 78 |
| 7.0 | 102 |

Example III

The procedure of Example I was repeated using 175 parts of carane and 350 parts of aqueous 50% sulfuric acid. The bromine numbers of samples taken at various intervals are as follows:

| Time (hrs.): | Bromine number |
|---|---|
| 0.5 | 103 |
| 1.5 | 134 |
| 3.0 | 141 |
| 4.0 | 141 |

Infrared analysis of the sample taken at 0.5 hour indicated the presence of 20–45% of carane and 30% of 3-menthene. Infrared analysis of the final product indicated that no carane remained but that 65–70% 3-menthene, 7–8% 8,9-menthene and unidentifiable menthenes were present. The hydrogen absorption value of the final product was 1.42% indicating that it was substantially all menthenes. Vacuum distillation of this product indicated that no appreciable amount of menthene polymers was present.

Example IV

In a reaction vessel there were placed 350 parts of carane and 175 parts of aqueous 67% sulfuric acid. This mixture was heated with continuous agitation to a temperature of 45° C. and this temperature was maintained for 6 hours. The bromine numbers of samples taken from time to time are given below.

| Time (hrs.): | Bromine number |
|---|---|
| 0.5 | 11 |
| 2.0 | 19 |
| 4.0 | 30 |
| 6.0 | 36 |

The slowness of this reaction in comparison with preceding reactions is attributable to the lower temperature employed.

Example V

Into a reaction vessel there were placed 175 parts of carane and 350 parts of aqueous 25% sulfuric acid. This mixture was heated with continuous agitation over a period of about 20 minutes to the reflux temperature (approximately 105° C.) and this temperature was maintained for 7 hours. The bromine numbers of samples taken at various intervals were as follows:

| Time (hrs.): | Bromine number |
|---|---|
| 2.0 | 32 |
| 5.0 | 73 |
| 7.0 | 91 |

Example VI

Into a reaction vessel there were placed 300 parts of carane and 600 parts of aqueous 60% phosphoric acid. The mixture was heated to reflux (approximately 103° C.) for 5 hours with continuous agitation. Samples, taken as previously described, showed bromine numbers as follows:

| Time (hrs.): | Bromine number |
|---|---|
| 1.0 | 14.7 |
| 3.0 | 66.0 |
| 5.0 | 85.0 |

Example VII

The procedure of Example VI was followed substituting 600 parts of aqueous 20% hydrochloric acid for the phosphoric acid of the prior example. The bromine numbers of samples taken during the reaction were as follows:

| Time (hrs.): | Bromine number |
|---|---|
| 1.0 | 50 |
| 3.0 | 77 |
| 5.0 | 92 |

Example VIII

Into a reaction vessel there were placed 300 parts of carane and 300 parts of aqueous 50% oxalic acid. The mixture was heated to reflux temperature with continuous agitation for 3 hours. Bromine numbers of samples taken at the end of 1, 2, and 3 hours were determined and infrared analyses of the samples were also made. The results are as follows:

| Time (Hrs.) | Bromine Number | I. R. Analysis (Approximate) |
|---|---|---|
| 1 | 71 | 35–40% carane, 15% 3-menthene, 8–10% 8,9-menthenes.[1] |
| 2 | 130 | 10–15% carane, 35–40% 3-menthene, 8–10% 8,9-menthenes.[1] |
| 3 | 131 | 5–10% carane, 40–50% 3-menthene, 7–9% 8,9-menthenes.[1] |

[1] Unidentifiable menthenes were also present.

As stated before, the process of the invention comprises contacting carane at a temperature from about −15 to 200° C. with a strong acid that is nonoxidizing at the reaction temperature in the presence of sufficient water to dilute said acid to the point that isomerization of carane to menthenes takes place without substantial polymerization.

The acids which are operable in the invention are those inorganic and organic acids which are nonoxidizing at the reaction temperature and which are at least as strong as acetic acid. Thus, nitric acid is excluded because of its oxidizing properties but other mineral acids such as sulfuric acid, phosphoric acid, hydrochloric acid, hydrobromic acid, thiophosphoric acid, and like inorganic acids are included. Similarly, organic acids such as acetic acid, oxalic acid, chloroacetic acid, dichloroacetic acid, trichloroacetic acid, maleic acid, p-toluene sulfonic acid, hexyl sulfonic acid, and other organic acids that can be classified as strong acids within the meaning of the invention are operable. Of all the acids that are useful, sulfuric acid is preferred by reason of the rapidity of reaction obtained therewith coupled with its relatively low cost.

Since the object of the invention is to effect isomerization without substantial polymerization, the use of strong acids in concentrated form is to be avoided because under such conditions the ultimate reaction that occurs is polymerization. Accordingly, water must be employed as a diluent, the exact amount of water in any given instance depending upon the strength of the acid that is to be used. The stronger the acid is, the larger the quantity of water in relation to the acid that will be required. Taking sulfuric acid as exemplary, isomerization without polymerization can be brought about if sufficient water is used to dilute the acid to at least about 75% concentration. The invention, however, is not limited to any fixed minimum concentration because any finite concentration of acid can promote the desired reaction although in the case of sulfuric acid, for example, a concentration below about 10% results in a slow reaction.

The same teachings with respect to the concentration of acid are applicable to the other acids mentioned above, bearing in mind the fact that the weaker the acid, the more concentrated it may be. Thus, for example, acetic acid may be employed in a concentration as high as about 96% whereas phosphoric acid must be diluted to about the same extent as sulfuric acid. From this explanation, those skilled in the art will readily understand the approximate maximum concentrations of acid which can be utilized.

The quantity of acid in relation to the quantity of carane can be widely varied with some influence, of course, on the rapidity of the reaction. In general, the greater the quantity of acid in relation to carane, the more rapid the reaction will be. As a practical matter it is desirable that the weight of acid plus the weight of water not exceed about 10 times the weight of carane. On the opposite extreme, it is desirable from the practical standpoint that the weight of acid plus the weight of water be not less than about 2% by weight of the carane. It is preferred that the combined weight of acid and water be from about 0.5 to 3 times the weight of carane.

The reaction is desirably carried out by agitating a mixture of carane, water, and acid at a temperature within the range previously stated. In accordance with the general rules of chemistry, the higher the reaction temperature, the greater will be the rapidity of the reaction. However, for practical purposes it is desirable to avoid the use of pressurized equipment so that a temperature no higher than the atmospheric reflex temperature of the reaction mixture is preferred. With the aforesaid considerations in mind, a preferred range of reaction temperatures is from about 20 to 110° C.

The time of reaction is quite variable since it depends upon the numerous factors discussed above. Under the preferred conditions, however, it can be said that the reaction will ordinarily require from about 1 to 15 hours for substantial completion. At the termination of the reaction, the reacted mixture may be separated by a simple decantation into an oil layer and a water layer. The oil layer, of course, contains the desired reaction product and traces of acid which may contaminate this product can be removed by washing with water. In the usual case, the product will comprise a mixture of unreacted carane, 3-menthene, and other menthenes. If the menthenes are desired in pure form, they may be separated from the reaction mixture by fractional distillation or other conventional separatory techniques.

What I claim and desire to protect by Letters Patent is:

1. The process for the isomerization of carane to menthenes which comprises contacting carane at a temperature of from about 20 to 110° C. with an aqueous acid selected from the group consisting of aqueous sulfuric acid of a concentration no greater than 75%, aqueous phosphoric acid of a concentration no greater than 75%, aqueous hydrochloric acid of a concentration no greater than 20%, aqueous oxalic acid of a concentration no greater than 50%, and aqueous acetic acid of a concentration no greater than 96%.

2. The process for the isomerization of carane to menthenes which comprises contacting carane at a temperature of from about 20 to 110° C. with aqueous sulfuric acid of a concentration no greater than 75%.

3. The process for the isomerization of carane to menthenes which comprises contacting carane at a temperature of from about 20 to 110° C. with aqueous phosphoric acid of a concentration no greater than 75%.

References Cited in the file of this patent
UNITED STATES PATENTS

| | | |
|---|---|---|
| 2,097,744 | Sheffield | Nov. 2, 1937 |
| 2,399,741 | Ipatieff et al. | May 7, 1946 |